J. C. DAVISON.
CHICKEN COOP.
APPLICATION FILED NOV. 14, 1907.

915,565.

Patented Mar. 16, 1909.
4 SHEETS—SHEET 1.

Witnesses
Louis R. Heinrichs
C. H. Griesbauer

Inventor
John C. Davison
By H. B. Willson & Co.
Attorneys

J. C. DAVISON.
CHICKEN COOP.
APPLICATION FILED NOV. 14, 1907.
915,565.
Patented Mar. 16, 1909.
4 SHEETS—SHEET 2.
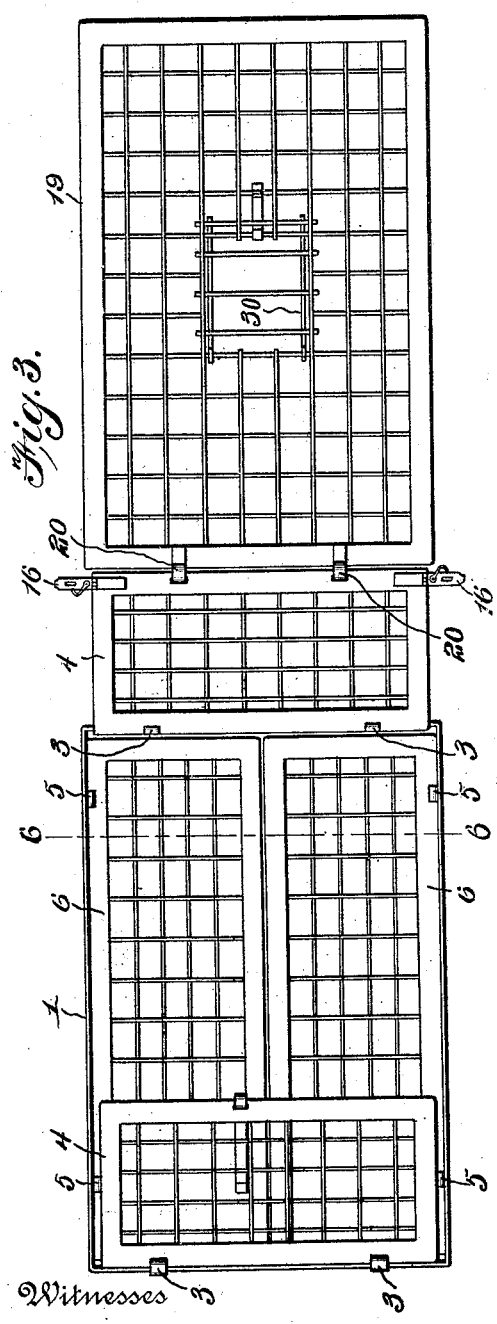
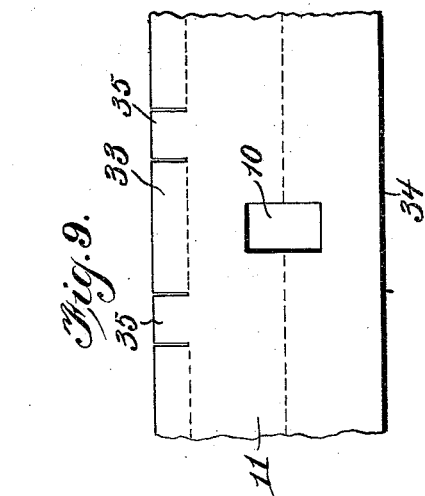
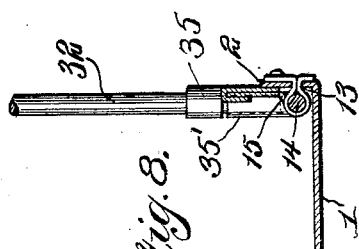
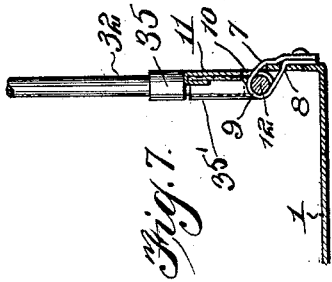
Witnesses
Louis R. Heinrichs
C. H. Giesbauer
Inventor
John C. Davison
By H. B. Willson &co
Attorneys

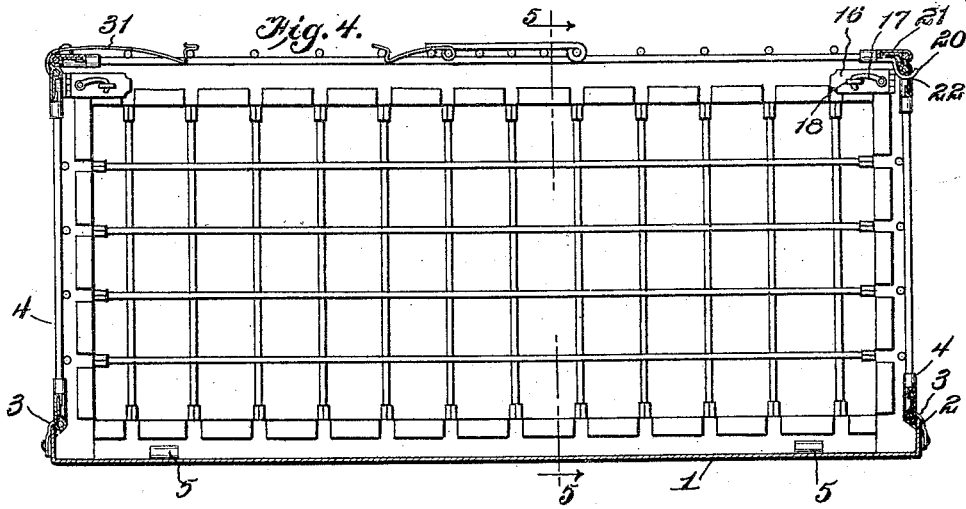
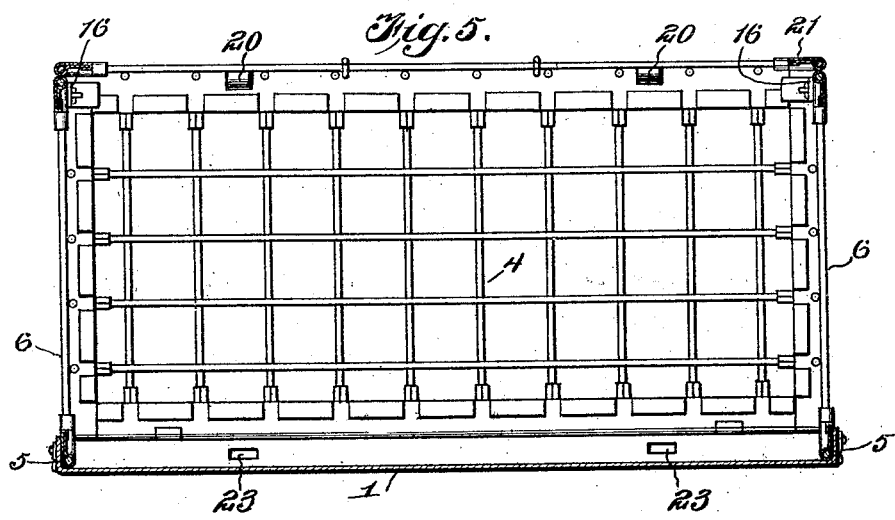
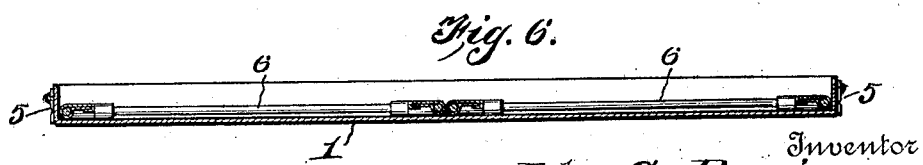

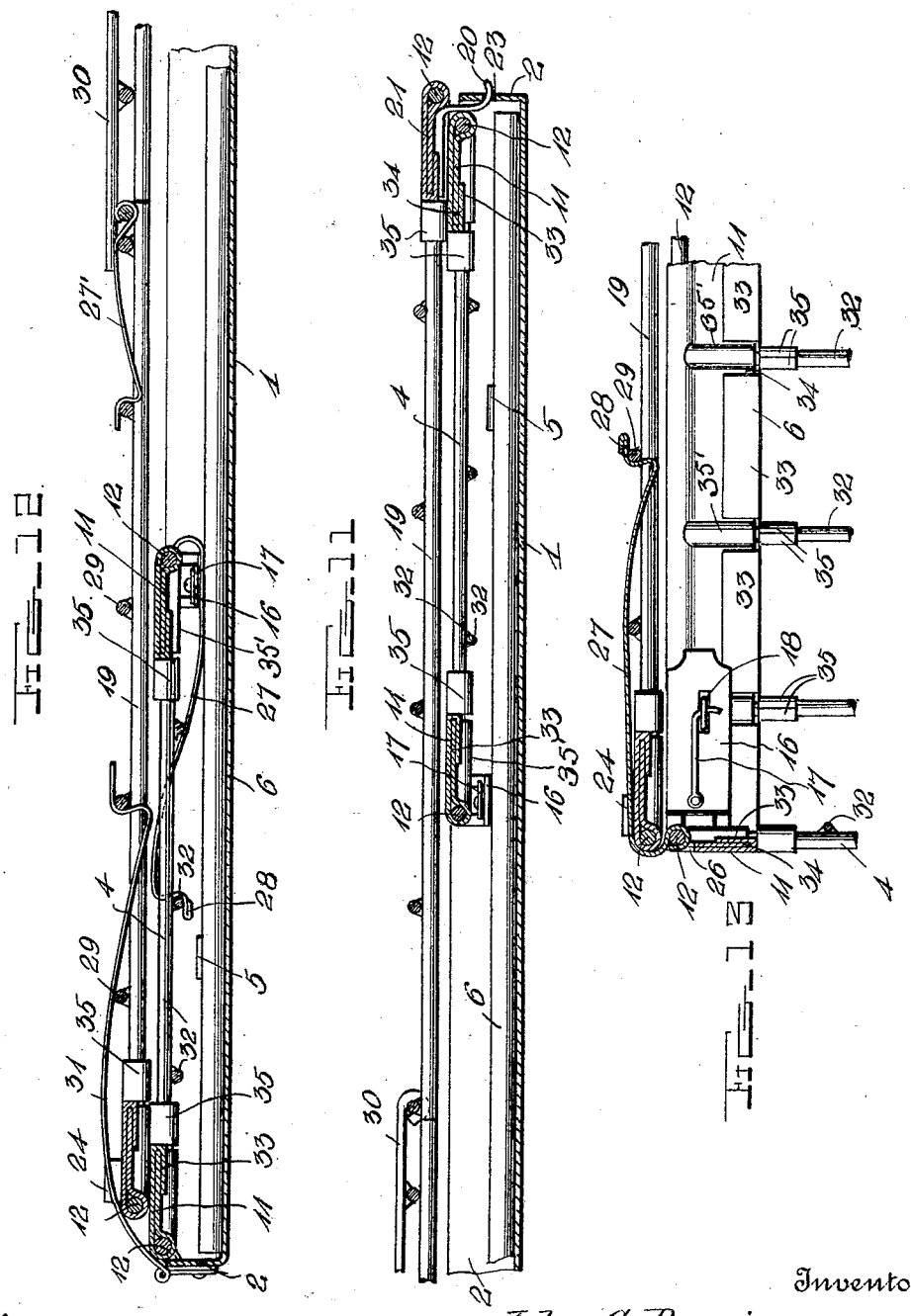

UNITED STATES PATENT OFFICE.

JOHN C. DAVISON, OF GREAT BEND, KANSAS, ASSIGNOR OF ONE-HALF TO E. J. PIPER, OF GREAT BEND, KANSAS.

CHICKEN-COOP.

No. 915,565.  Specification of Letters Patent.  Patented March 16, 1909.

Application filed November 14, 1907. Serial No. 402,196.

*To all whom it may concern:*

Be it known that I, JOHN C. DAVISON, a citizen of the United States, residing at Great Bend, in the county of Barton and State of Kansas, have invented certain new and useful Improvements in Chicken-Coops; and I do declare the following to be a full, clear, and exact description of the invention, such as will enable others skilled in the art to which it appertains to make and use the same.

This invention relates to folding chicken coops, and has for its object to provide a coop of this kind which may be conveniently folded into a small space for shipping.

Another object is to provide a coop of this kind made of metal having certain peculiar and advantageous details of construction, as will hereinafter appear.

Herein I have described one embodiment of my invention, and while I have herein mentioned minute details, I do not limit myself to these, as the details of construction and arrangement may be greatly varied without departing from the spirit and scope of the invention.

Figure 1:
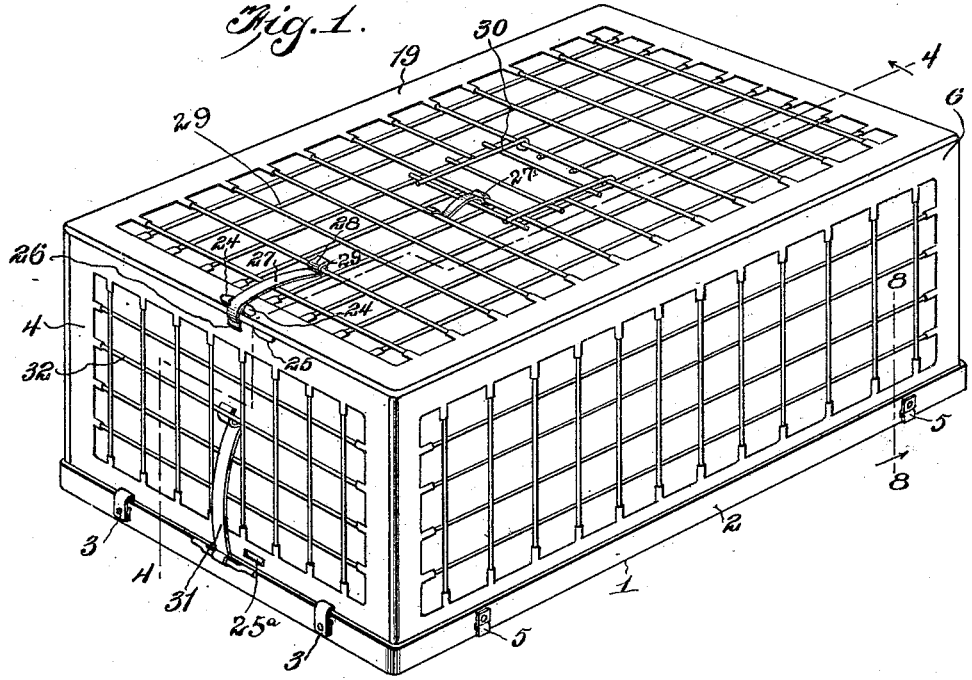
Figure 2:
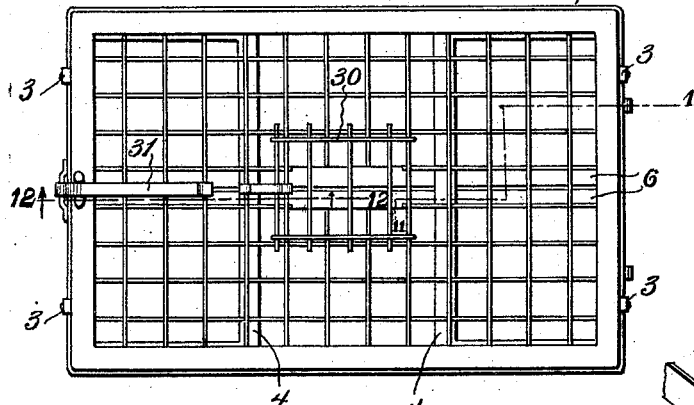
Figure 10:
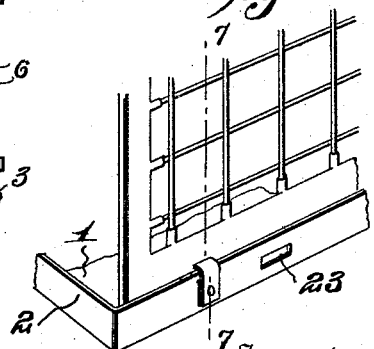

In the annexed drawings, forming a part of this specification, and in which like reference characters refer to like parts throughout the several views, Figure 1 is a perspective view of the coop unfolded, the rear walls being omitted to avoid confusion in the drawing. Fig. 2 is a top plan view of the coop folded, the cross wires of the sides and ends being omitted; Fig. 3 is a top view of the coop partly folded, the sides and one end being folded against the bottom and one end and the top being folded out in the same plane with the bottom; Fig. 4 is a longitudinal sectional view taken on the line 4—4 of Fig. 1; Fig. 5 is a transverse sectional view taken on the line 5—5 of Fig. 4; Fig. 6 is a transverse sectional view taken substantially on the line 6—6 of Fig. 3, only the bottom and sides being shown; Fig. 7 is an enlarged sectional view taken on the line 7—7 of Fig. 10; Fig. 8 is an enlarged sectional view taken on the line 8—8 of Fig. 1 with the hinge shown in full lines; Fig. 9 is an enlarged view of the sheet metal binding blank, before being combined with the other parts; Fig. 10 is an enlarged detail perspective view of one corner of the coop, showing an end hinge; Fig. 11 is a fragmentary sectional view on the line 11—11 of Fig. 2, Fig. 12 is a fragmentary sectional view on the line 12—12 of Fig. 2, and Fig. 13 is a fragmentary longitudinal section through the latching member 27, as shown in Fig. 1.

As shown, my coop comprises a sheet metal bottom 1, having an upturned flange 2 all the way around. This flange is provided with end hinges 3, to which are fastened end sections 4. This flange is also provided with side hinges 5, to which are fastened side sections 6. The end hinges 3 consist of a strip of sheet metal 7, passed through a slot 8 in the flange 2, and screwed or soldered to the outside of the flange, as best shown in Fig. 7.
The upper part of said strip forms a loop 9, which is passed through a slot 10, in the sheet metal binding 11, of the end piece 4. This binding is folded over a bead wire 12, to form said end sections 4 and also to form a bearing around which is looped said strip or metal 7.

The side hinge 5 consists of a similar strip of metal passed through a slot 13 in the flange 2 around a similar bead wire 14, and through a slot 15, as clearly shown in Fig. 8. It will be noticed that the hinge 3 is at the top of the flange 2, while the hinge 5 is placed as near as practicable to the bottom plate 5. This arrangement is provided in order that the side sections 6 may be folded flat against the bottom plate 1, and then the end sections may be folded on top of the side sections, as shown in Fig. 3.

Near the upper corner of each end section is fastened inside a transversely pivoted hasp 16, provided with a hook 17, adapted to engage a staple 18 in the side section 6 when the sections are set up, as shown in Figs. 1, 4 and 13.

When the sections are folded as shown in Fig. 2, these hasps may be folded flat against the end sections 4, as will be readily understood. The top section 19 is provided with downwardly, outwardly and upwardly turned hooks 20, fastened to the under side of the binding 21 of said top section adapted when the coop is unfolded to be received by slots 22 in the upper binding of one end section, as best shown in Fig. 4.

When the coop is folded, the hooks 20 are placed in engagement with slots 23 in the flange 2, as clearly shown in Figs. 5, 10 and 11. The other end of the top section 19 is provided with upwardly extending lugs 24 and a downwardly extending lug 25 carried by the upper bead strip of the top section, and adapted, when the crate is folded, to engage an aperture 25ᵃ formed in the lower part of said section to hold the parts in position. Adjacent the end lugs 24 and 25 and secured to the top bead strip through a slot 26 in the end section 4 is a spring latch 27, adapted to pass over the end of said top section and be received between the lugs 24. The spring latch 27 is bent to form a reversed hook 28, adapted to catch over and under one of the wires 29 of the top section 19. The top 19 is also provided with a door 30, as shown. The door is provided with a latch 27′, similar in construction and operation to the latch 27, and secured by a loop to one of the wires of the top section 30.

It will be noticed that the latch 27 may be used to prop the top section 19 open by engaging under the bead wire of said top section. In like manner, the door 30 may be propped open by its latch 27′ engaging under the wire of the free end of the door.

When the coop is folded, as in Fig. 2, the latch 27 is folded over and under its end section 4 and hooked to one of the wires of said end section, as shown in Fig. 3. The flange 2 is provided at the end opposite the slots 23 with a pivoted spring latch 31. This latch is used to hold the top section in place when the coop is folded, as clearly shown in Fig. 2.

When the coop is set up the latch 31 may be held out of place by engagement with one of the wires 32 of the end section 4, as shown in Fig. 1.

The side and end sections and the top section are all of substantially the same construction; therefore, only the construction of the end section will be described in detail. The end section 4 consists of a frame formed by the bead wire 12, which entirely surrounds the outer edge of said section. A binding strip 11 is folded over said bead, the flaps 33 being bent to lap over the opposite edge 34 of the binding strip. The smaller flaps 35 are each bent around a cross wire 32, the latter forming a substantial connection adapted to receive solder. The wires are shown crossed at right angles, and may be soldered together at the crossing. The wires 32 enter the bulged portion 35′ formed upon the strip and are thereby further held in correct position.

The operation of my device is as follows: The coop being set up, as shown in Fig. 1, is adapted to receive the fowls to be shipped. After the same have been shipped it is usually necessary to send the coop back to the first shipper. In order to save express charges and wear and tear on the coop, it is desirable to fold the same in as small a space as possible. This is done as follows: The latch 31 is undone and the top section 19 is unhooked from the slots 22. The side sections are folded down in place, the staple 18 being arranged thereunder. The end sections 4 are then folded in place with the latch 27 folded under, as above described. The hooks 20 are then inserted in the slots 23 and the top section 19 folded down flat over the other sections and latched in place by the spring latch 31. When it is desired to unfold the coop again, the above described operation is reversed.

Having thus described my invention, what I claim is:

In a device of the class described, a bottom plate having an upturned flange therearound, said flanges having slots therein, looped strips passed through said slots, side and end sections comprising a frame consisting of a bead wire and a metal binding strip having a slot in the lower edge exposing said bead wire and adapted to receive said strip to form a hinge between said sections and said flange, said flange having additional slots at one end of said plate, a top section having hooks adapted to be received by said additional slots when said side and end sections are folded, one of said end sections having slots in the upper edge thereof adapted to receive said hooks when the coop is unfolded, a latch at the opposite end of the coop to hold in place the top when the coop is unfolded, another latch pivoted to said flange to hold said top in place when said coop is folded, and means to hold said side and end sections together when the coop is unfolded.

In testimony whereof I have hereunto set my hand in presence of two subscribing witnesses.

JOHN C. DAVISON.

Witnesses:
O. W. DAWSON,
H. C. COLEGROVE.